United States Patent [19]
Levien

[11] Patent Number: 5,315,406
[45] Date of Patent: May 24, 1994

[54] SCREEN GENERATION FOR HALFTONE SCREENING OF IMAGES USING ARBITRARY DISTRIBUTION OF TRANSFORMED SCREEN COORDINATES

[76] Inventor: Raphael L. Levien, P.O. Box 31, McDowell, Va. 24458

[21] Appl. No.: 805,278

[22] Filed: Dec. 10, 1991

Related U.S. Application Data

[63] Continuation-in-part of Ser. No. 768,135, Sep. 27, 1991, which is a continuation-in-part of Ser. No. 753,893, Sep. 3, 1991.

[51] Int. Cl.$^5$ .............................................. H04N 1/40
[52] U.S. Cl. .................................. 358/456; 358/459; 358/466; 358/534
[58] Field of Search ............... 358/400, 401, 429, 452, 358/455, 456, 457, 458, 465, 466, 75, 80, 296, 298, 77, 451; 101/211; H04N 1/40

[56] References Cited

U.S. PATENT DOCUMENTS

| | | | |
|---|---|---|---|
| 3,657,472 | 4/1972 | Taudt et al. | 358/500 |
| 4,149,194 | 4/1979 | Holladay | 358/298 |
| 4,185,304 | 1/1980 | Holladay | 358/298 |
| 4,413,286 | 11/1983 | Boston | 358/298 |
| 4,456,924 | 6/1984 | Rosenfeld . | |
| 4,499,489 | 2/1985 | Gall et al. | 358/75 |

FOREIGN PATENT DOCUMENTS

| | | | |
|---|---|---|---|
| 0303190A2 | 8/1988 | European Pat. Off. | H04N 1/40 |
| 0427380A2 | 8/1990 | European Pat. Off. | H04N 1/40 |
| 0493935 | 7/1992 | European Pat. Off. | H04N 1/40 |
| WO9102426 | 2/1991 | World Int. Prop. O. | H04N 1/40 |

OTHER PUBLICATIONS

Wolberg, Digital Image Warping, IEEE Computer Society Press, Los Alamitos, pp. 173-176.

*Primary Examiner*—Edward L. Coles, Sr.
*Assistant Examiner*—Jerome Grant, II
*Attorney, Agent, or Firm*—Allan Jacobson

[57] ABSTRACT

A halftone screen with precisely controlled angles and rulings, including irrational screen angles and rulings, for screening photographic images is generated by representing a desired screen pattern in an irregular or non-grid like array of screen elements. In one embodiment, a random array of screen elements is used. In another embodiment, a Poisson-disk distribution of screen elements is used to improve quality. The error between an ideal screen point and an actual screen point in the transformed UV space is calculated and used as the basis for selecting an actual screen point as having the least error between the ideal and actual screen points in UV space. The number of error calculations may be reduced by storing pointers the nearest points to each screen point in transformed UV space, and by storing a plurality of successive screen values at a given angle and screen ruling corresponding to each point in the transformed UV space.

44 Claims, 7 Drawing Sheets

SCREEN GENERATION FOR HALFTONE SCREENING OF IMAGES USING ARBITRARY DISTRIBUTION OF TRANSFORMED SCREEN COORDINATES

This is a continuation-in-part application of U.S. patent application entitled, "SCREEN GENERATION FOR HALFTONE SCREENING OF IMAGES USING SCAN LINE SEGMENTS OF OVERSIZED SCREEN SCAN LINES", U.S. patent application Ser. No. 768,135 filed Sept. 27, 1991, which is a continuation in-part of U.S. patent application entitled, "SCREEN GENERATION FOR HALFTONE SCREENING OF IMAGES", U.S. patent application Ser. No. 753,893, filed Sept. 3, 1991.

FIELD OF THE INVENTION

This invention relates to the halftoning of photographic images using screen patterns, and more specifically to the generation of screen patterns with precisely controlled angles and rulings.

BACKGROUND OF THE INVENTION

In each of the above cited copending patent applications by the present inventor, a method and apparatus for halftone screening of images using strips of an ideal angled screen pattern to form the scan lines of a desired screen is described. Successive ideal strips are selected and assembled into a desired screen on the basis of the calculated error between the ideal screen point at the end of one strip, and the actual screen point at the beginning of the next strip. The present application relates to a general improvement in the method and apparatus for halftone screening of images. A background description of halftone image screening is set forth below.

Images are typically stored in a memory representing tone values for each pixel of the original image. For black and white image, the stored pixels represent the gray scale value corresponding to each pixel. For a color image, each color plane is stored as an array of pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink on the paper is used to represent the printed image. In order to represent halftones (shades between the presence or absence of the printed ink), the original image is screened to produce a pattern, such as variable size dots which appear to the human eye as a halftone image.

In order to prepare a photograph for printing, it is first necessary to perform the step of halftone screening, which converts the continuous gray shades of the original into dots of varying size and shape. Typically, these dots are arranged on a regular grid of approximately 100 dots per inch. This spatial frequency is known as the screen ruling. Thus, one square inch of the final printed photograph will be composed of approximately 10,000 dots.

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to herein as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark is generated by the marking engine, whereas if the value of the image pixel is less or equal to the screen cell value, then no mark is generated by the marking engine, or vice versa. In this way, the final screened image, composed of dots, is produced.

In color printing, there are four separate steps of halftone screening, one each for the cyan, magenta, yellow, and black inks. It is advantageous, in order to minimize objectionable moire patterns, to angle the halftone grid differently for each of the four planes. For example, the most common practice is to angle the cyan dots by 15 degrees, magenta by 75 degrees, yellow by 0 (or 90) degrees, and black by 45 degrees. If these angles are adhered to precisely, as well as the screen ruling being precisely identical for all four planes, then optimum results are achieved.

Precise screen angles can be achieved quite easily in photomechanical systems by simply rotating the photographic screen carrier. However, when the image is processed electronically, and the screened image is to be produced by a digital raster scan recording device, the problem becomes much more difficult. Rational numbers, which can be represented as the ratio of two integers, are relatively easy to accurately represent in a digital computer. Irrational numbers, which cannot be represented as the ratio of two integers, are much more difficult to accurately represent in a digital image processing device or digital computer. The tangent of a 15 or 75 degree angle is an irrational number. Therefore, screens of 15 and 75 degrees can be expected to be difficult to generate in a digital device. Also, irrational screen rulings where the number of pixels per screen cell is not a rational number ca be expected to be difficult to accurately reproduce in digital image processing device.

Prior art techniques fall into two classes. In the first class, the angles can be approximated, but not achieved precisely. These techniques are known as rational tangent angle techniques, because the screen angles are limited to arctangents of rational numbers. As a result of the inaccuracy of the screen angles and rulings, objectionable moire patterns result. A method exemplary of this technique is taught in U.S. Pat. No. 4,149,194 (Holladay). The screen pattern is represented by a strip of pixels. To generate the screen pattern, this strip is repeated across the width of the image. To angle the screen pattern, this strip is shifted by a certain number of pixels each scan line. An advantage of this technique is that it is very fast. Another advantage is the relatively modest memory requirement for the screen.

In the second class of screen generating techniques, precise angles and rulings can be achieved, but only at the cost of a large amount of computation for each pixel. This technique is described in U.S. Pat. Nos. 4,499,489 (Gall) and 4,350,996 (Rosenfeld). The device coordinate system is represented by XY space, and a halftone cell in the screen to be printed is represented by a vector in UV space, i.e. the coordinate system of the scaled and rotated screen. For each pixel, the position of the pixel in XY space is transformed into UV space. The screen pattern for that point can be determined by applying the spot function to the UV coordinates.

Although Gall and Rosenfeld describe certain speed optimizations, the disclosed technique requires many more operations per pixel than do rational angle techniques, and therefore runs considerably slower. Another technique for generating accurate screen angles is described in European Patent 0 427 380 A2 (Schiller). The Schiller patent describes a rational tangent angle method that can achieve fairly accurate screens at the cost of requiring a substantial amount of memory, typically on the order of hundreds of thousands of words.

The present invention provides a method for implementing a halftone screen pattern generation system for rotated screens including multiple angle and ruling combinations, and to produce a screened image formed with a rotated screen on a digital raster output device. In addition, the present invention provides a method of computing halftone screened images that can be implemented as a hardware circuit as well as a computer program.

Both Gall and Rosenfeld use a screen pattern consisting of screen elements arranged in a regular orthogonal array, i.e. a matrix or grid analogous to the mechanical screens used in the prior art. In accordance with a first aspect of the present invention, a screen pattern is represented in an irregular or non-grid like array of screen elements. In one embodiment, a random array of screen elements are used. In another embodiment, a Poisson-disk distribution of screen elements is used to improve quality.

In both Gall and Rosenfeld, the position of each pixel in XY space is transformed into UV space, and the screen pattern for that point is determined by applying the spot function to the UV coordinates. Typically however, there is no entry in the stored screen pattern grid of screen elements which corresponds exactly to the ideal screen point. Both Gall and Rosenfeld treat this problem by truncating (rounding downward) the coordinates of the ideal point to fit an actual screen point, regardless of the error introduced thereby. Rosenfeld indicates that individual U and/or V coordinate addresses can be rounded off (truncated) to the nearest address. Both Gall and Rosenfeld attempt to reduce the error (and loss of quality) caused by truncation, by introducing a random number to the screen memory address, which tends to disperse the resulting error throughout the screen.

In accordance with another aspect of the present invention, an actual screen point in UV space (i.e. a screen point for which an actual screen element is stored), is selected on the basis of an error calculation between the ideal screen point and the nearest actual screen points in UV space. In a specific embodiment, the length of the vector between the ideal screen point and each of the actual screen points is calculated. The smallest vector length between ideal and actual screen points represents the actual screen point selected having the minimum error. To reduce the number of necessary calculations, the four nearest points to the ideal point that succeeds each screen point are also stored in association with each entry in the stored screen pattern.

In accordance with another aspect of the present invention, the length of respective error vectors is approximated by the sum of the absolute values of the component orthogonal coordinate distances between ideal and actual screen points (instead of the typical sum of the squares calculation of vector length) thereby reducing the computational burden.

In accordance with yet another aspect of the present invention, a plurality of screen values is stored corresponding to each point in the transformed UV space. Thus, for each selected actual screen point, a plurality of screen pixels representing successive points of an ideal angled screen pattern are generated. Specifically, if 16 screen pixels of the spot function are stored for each point in UV space, then the error calculation referred to above need only be performed once for every 16 output pixels.

The method of the present invention can be practiced in a system including a scanner, an image processing device, and a raster scan output device. An original image is optoelectronically scanned and stored in memory. The image to be reproduced is divided into picture elements, or pixels, of a size suitable for halftone reproduction. On reproduction, each halftone dot is printed as a combination of smaller picture elements.

A halftone screened image is produced by (a) retrieving the pixel of the stored image pixel that corresponds to the present output pixel, (b) generating one pixel of the screen pattern, (c) comparing the image pixel and screen pixel, and (d) marking or not marking the output pixel on the basis of which was greater. The process is repeated for every output pixel. The sequence of output pixels is a raster scan, i.e. one horizontal scan line sequence of pixels followed by another horizontal scan line of pixels, which is the standard sequence for most image processing systems. The key problem solved by the present invention is to accurately generate the screen pixels in raster scan sequence.

DETAILED DESCRIPTION OF THE INVENTION

Figure 1:
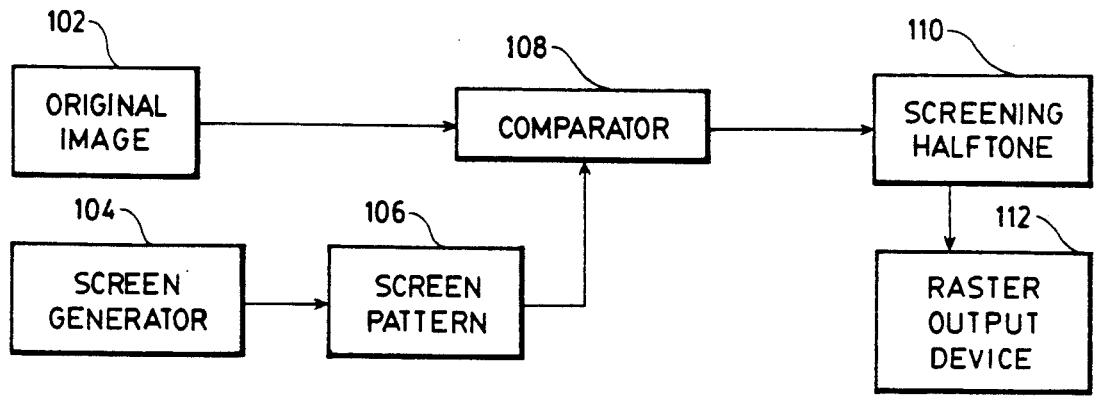
FIG. 1 shows a block diagram of a halftoning system utilizing the present invention.

The purpose of the present invention is to produce screened halftones from original images. Referring to FIG. i, an original image source 102 is photomechanically scanned or otherwise prepared for reproduction in digital form, at which point it is presented to digital comparator 108. Although screening is described as a comparison operation between an input image and a screen pattern, it is to be understood that other operations between an input image and a screen pattern, such as multiplication, also qualify as a "screening" operation.

A screen generator 104, preferably implemented as a program running on a digital computer, produces screen pattern 106, which is also presented to comparator 108. Both the original image 102 and the screen pattern 106 are composed of tiny sub-region known as pixels, each of which represents a single gray shade.

Comparator 108 performs a pixel-by-pixel comparison of the original image 102 and the screen pattern 106 At pixel locations where the pixel from original image 102 is greater (i.e. a darker shade of gray) than the corresponding pixel from the screen pattern 106, the corresponding pixel in the screened halftone 110 is marked. At all other pixel locations, the screened halftone 110 is not marked, or alternatively, is marked a different way or with a different color.

The resulting screened halftone 110 is composed of dots of varying size and shape, each of which is composed of a number of pixels. Screened halftone 110 is then conveyed to raster output device 112, at which point it is recorded on photographic film or other image forming means.

Figure 2:
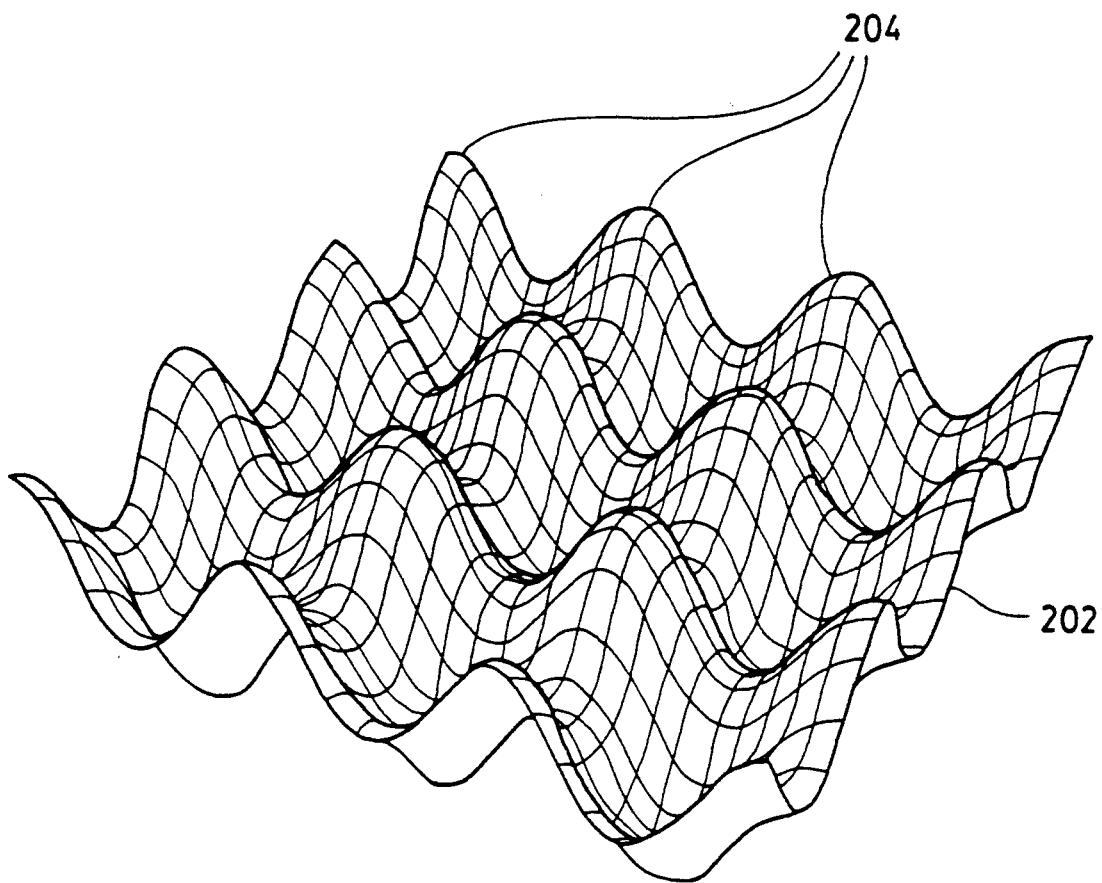
FIG. 2 shows the screen pattern as a three dimensional plot which may be used in conjunction with the present invention.

FIG. 2 shows a section of screen pattern 106 depicted as a surface in three dimensions. The grid squares represent individual screen pixels, while the height of each grid square represents the gray shade of the screen pattern at that pixel. Peak 204 represents a maximum gray shade; between peaks 204 are minimums representing minimum gray shades. A section through the surface in FIG. 2 will depict he spot function, which is roughly illustrated as a sine wave in the figure.

Figure 3:
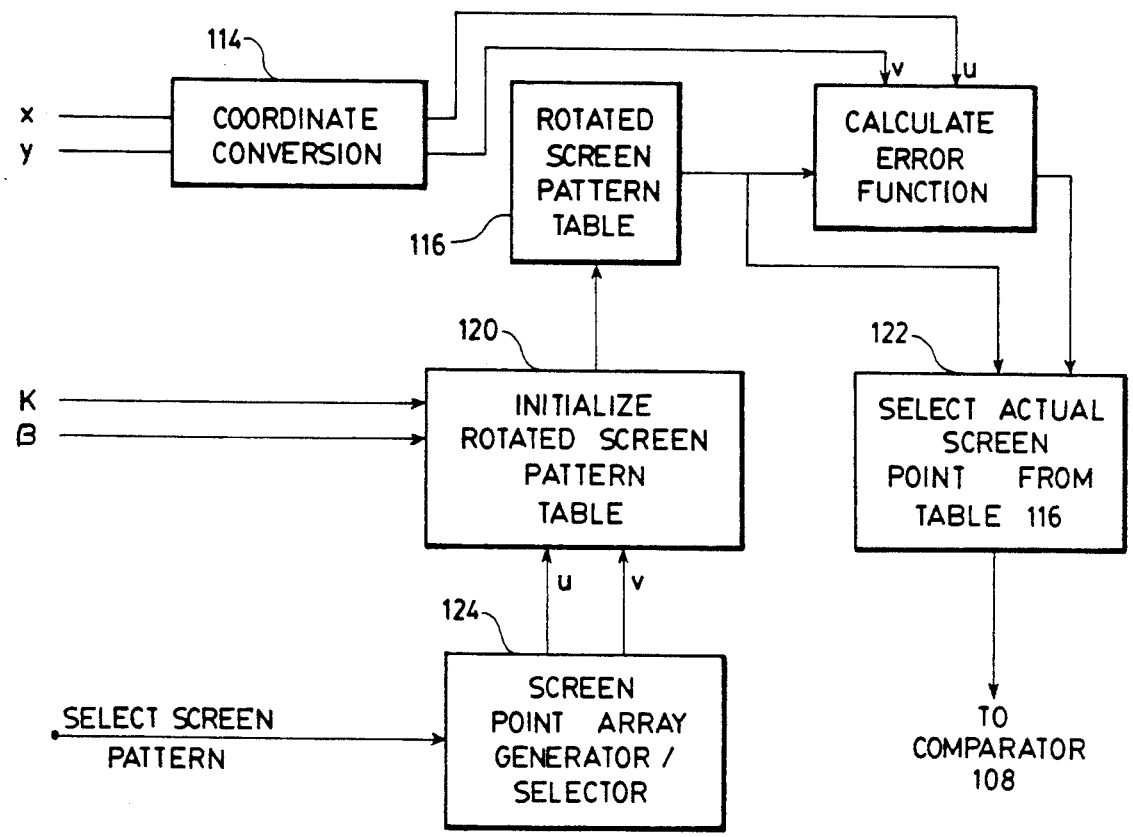
FIG. 3 shows a block diagram of screen pattern generator corresponding to screen generator 104 and screen pattern 106 in FIG. 1 in accordance with the present invention.

A block diagram of the screen generator 104 for generating screen pattern 106 is shown in FIG. 3. A screen point array generator/selector 124 is responsive to a select screen pattern control signal to generate or select a pattern of screen points in UV space. The selected pattern of screen points are used to initialize 120 a table of rotated and scaled screen points in UV space according to the desired screen angle beta, and scaled according to the desired screen ruling K. The rotated and scaled screen pattern is stored in memory 116. A coordinate converter 114 converts from XY space, the orthogonal coordinates of the image input pixels, and to UV space, the rotated and scaled coordinates of the screen pattern array. The output of the coordinate converter 114 represents the desired ideal in UV space for which a screen value is to be generated. An error function calculation 118 is responsive to the desired ideal UV screen point and the actual available stored screen points contained in the stored screen pattern table 116. The error calculation 1118 result is coupled to means 122 for selecting an actual screen point from table 116 for output to comparator 108.

In operation, a desired screen ruling K and screen angle beta is set as an input to the system. Using K and beta, a screen point array is selected 124, initialized 120, and stored in memory 116. Successive raster scan input points in XY space are converted to respective ideal desired screen points in UV space by a rotation and scaling operation 114. Previously initialized and stored values of the spot function in memory 116 are compared to the desired ideal screen point. If there is an entry in the stored table in memory 116 which corresponds to the ideal desired screen point, the stored value is output to comparator 108. Typically however, no actual UV screen point entry in the stored table in memory 116 exactly corresponds to the ideal desired UV screen point coordinates. The error between the ideal desired UV screen point and the nearest actual UV screen points is calculated at 118. Based on the error calculation, the stored screen point in UV space which corresponds to the smallest calculated error is selected, and the corresponding stored spot function in memory 116 is the selected UV screen point for output to comparator 108.

Figure 4:
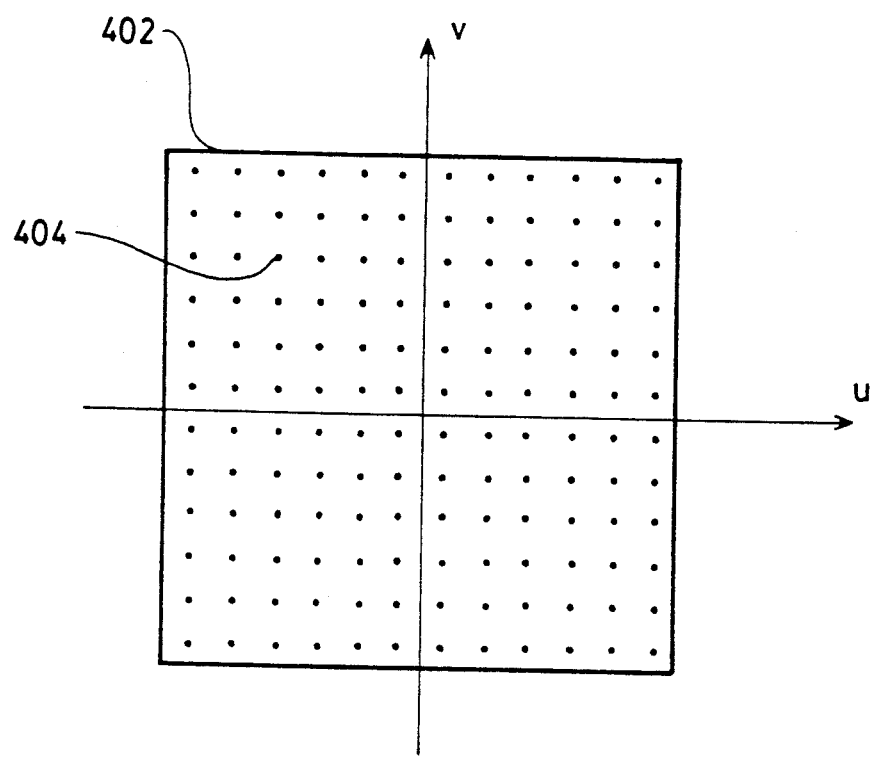
FIG. 4 is a screen pattern comprising screen elements in an orthogonal grid-like array known in the prior art.
Figure 5:
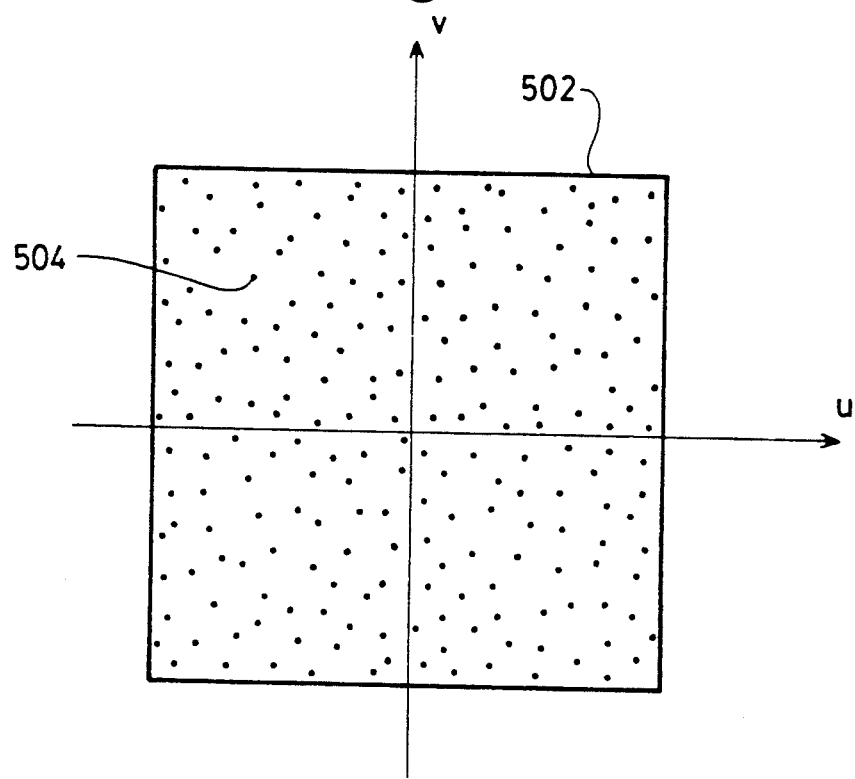
FIG. 5 is a screen pattern comprising screen elements in a random array in accordance with the present invention.
Figure 7:
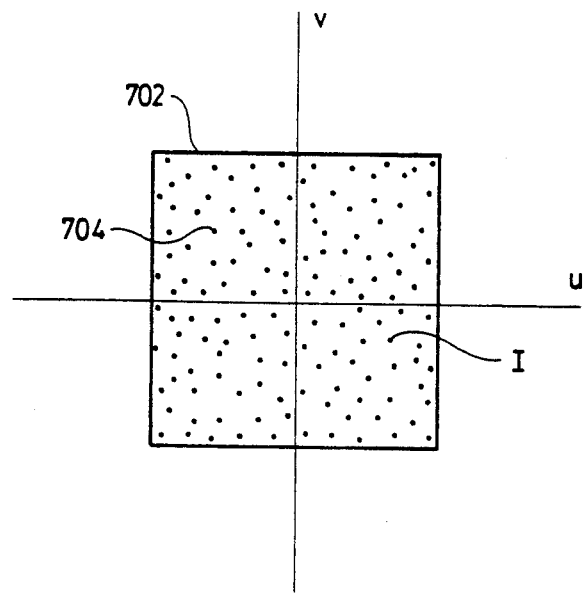
FIG. 7 is a screen pattern consisting of screen elements in a Poisson-disk distribution array in accordance with the present invention.
Figure 7:
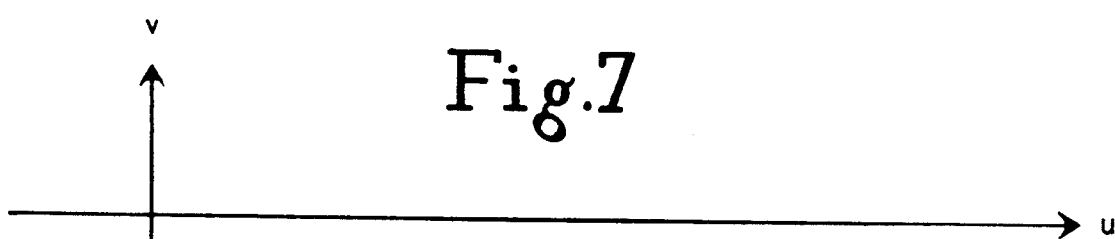

A graphical illustration of the stored screen pattern array known in the prior art is shown in FIG. 4. Modulo addressing is used to repeat (tile) the halftone cell over the entire input image. The prior art screen pattern 402 consists of stored screen elements 404 arranged on a regular orthogonal array, i.e. a matrix or grid analogous to prior art mechanical screens. By comparison, in FIG. 5, the stored screen pattern 502 in accordance with one embodiment of the present invention includes a random array of screen points 504. In accordance with another embodiment of the present invention illustrated in FIG. 7, the stored screen pattern 702 includes a Poisson-disk distribution of screen points 704. Poisson-disk distributions are more evenly distributed, with less clumping of screen points. Quality is somewhat improved by using a random Poisson-disk distribution of UV points rather than a totally random distribution.

A typical stored rotated screen pattern table is given below:

| No. | U | V | value of spot function | points close to next point |
|---|---|---|---|---|
| 0 | 0.5292 | 0.0436 | 0.4949 | 7, 36, 41, 9 |
| 1 | 0.2949 | 0.0411 | 0.6721 | 18, 63, 24, 34 |
| 2 | 0.2848 | 0.7869 | 0.5031 | 5, 15, 49, 27 |
| — | — | — | — | — |
| N | u | v | s | A, B, C, D |

As indicated above, the U and V values are selected randomly. The size of the table depends upon the desired quality in that a larger table provides better quality but requires more memory. A larger table ensures that there are more points nearby an ideal point; therefore it is more likely that one actual screen point will be closer to the ideal screen point. The average error is less, and the quality is better. Spot function values are calculated according to a suitable function such as for example by the formula:

$$\frac{2 + \cos(2*pi*U) + \cos(2*pi*V)}{4}$$

Figure 8:
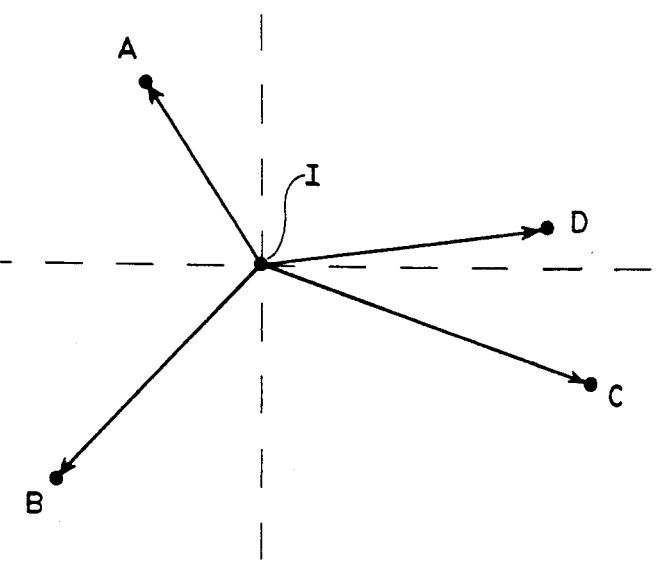
FIG. 8 is a vector diagram in UV space illustrating the error calculation between a desired ideal screen point and the four nearest actual screen points in accordance with the present invention.

During the initialization, along with each table entry, a list of table indices, pointing to other table entries which are fairly close to the next sample point in the scan line are stored with each UV screen point. The UV coordinates of each table entry are added to the XY point (1,0) transformed into UV coordinates. Then table is searched for the "n" table entries closest to the resulting point, and the "n" values thus found are stored as the points closest to the next point. By way of illustration, four points, A, B, C and D, close to the next point I, is shown in FIG. 8. One great advantage of this technique is that no longer does a larger table lead to slower operation. The speed is now independent of table size.

The above table shows one spot function entry for each UV coordinate. However, instead of storing only one value of the spot function in each table entry, a number of spot function values, say 16, may be stored for each table entry. The choice of 16 values is convenient because each table entry can now be used for screening one 16 pixel word of the output halftone, rather than just one pixel. The first of the 16 values is calculated as before, by applying the spot function to the present UV coordinates. The second value is determined by applying the spot function to the vector sum of the present UV coordinates and the XY point (1,0) transformed into UV space. The third value is determined by applying the spot function to the vector sum of the present UV coordinates and the XY point (2,0) transformed into UV space, and so on up to a displacement in XY space of (15,0).

If 16 screen sample points for each table entry are stored, then the screen sample points close to the "next" point are computed as above except that the XY point (16,0) transformed into UV coordinates is added to the present entry. The value (16,0) is used because each successive entry in the table represents jumping ahead 16 pixels at a time in the generation of the desired halftone screen. The advantage of storing 16 values is that the error calculation, described below, need only be performed once for every 16 output pixels. The drawback is that more memory is required. A value larger than 16 will provide even greater speed at the expense of greater memory. Alternatively, screen quality can be improved at the expense of memory by using a larger table, i.e. having a larger number of U and V entries. In general, the average error, a measure of screen quality, will be proportional to the square root of the reciprocal of the number of table entries.

Figure 6:
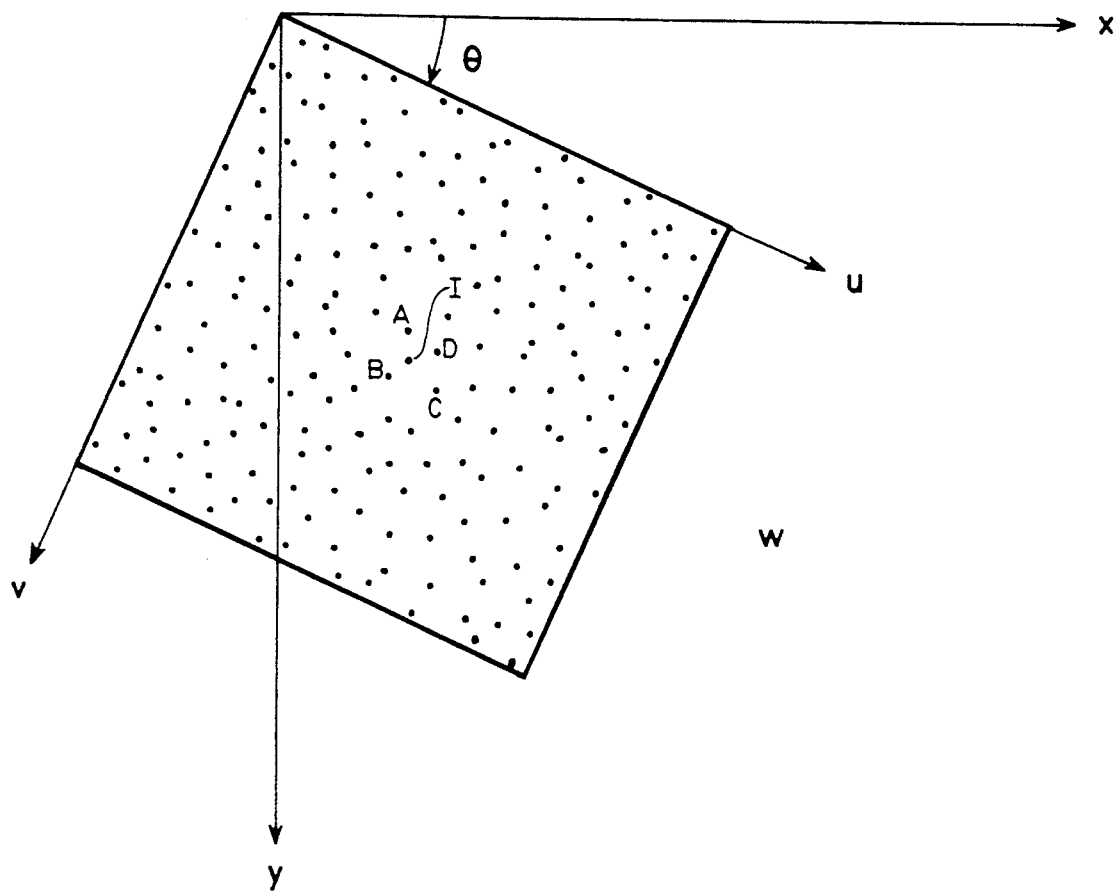
FIG. 6 shows a screen pattern array of screen elements in UV coordinates in relation to the output device in XY coordinates in accordance with the present invention.

The calculation of the error function is illustrated graphically in FIG. 8. Point I represents the ideal desired screen point in UV space resulting from the transformation of the actual raster scan XY point to UV space. From the table entry in which the previous UV point was selected, it is known that the points A, B, C or D will be the actual screen points in the table closest to the ideal screen point I. Points A, B, C, D and I transformed back into XY space is illustrated in FIG. 6. The transformed array repeats at the desired screen ruling K and the desired screen angle beta, including any arbitrary irrational ruling and angle in XY space.

The next actual screen point (A, B, C, or D) is selected on the basis of a minimized error function. In this case, the error function is the vector distance between I and the closest points. Thus the minimum vector length IA, IB, IC or ID represents the selection of the respective point A, B, C, or D as the actual screen point to be selected. Instead of calculating vector length by the sum of the squares of the distance in UV space (i.e., $du^2 + dv^2$), the sum of the absolute values of the distance in UV space (i.e., $|du| + |dv|$) may be used as an approximation to reduce the computational burden. Other error functions are possible, i.e. the error may be based on the stored screen spot function values at screen points A, B, C, and D, as well as the respective position of the stored screen elements in UV space.

Figure 9:
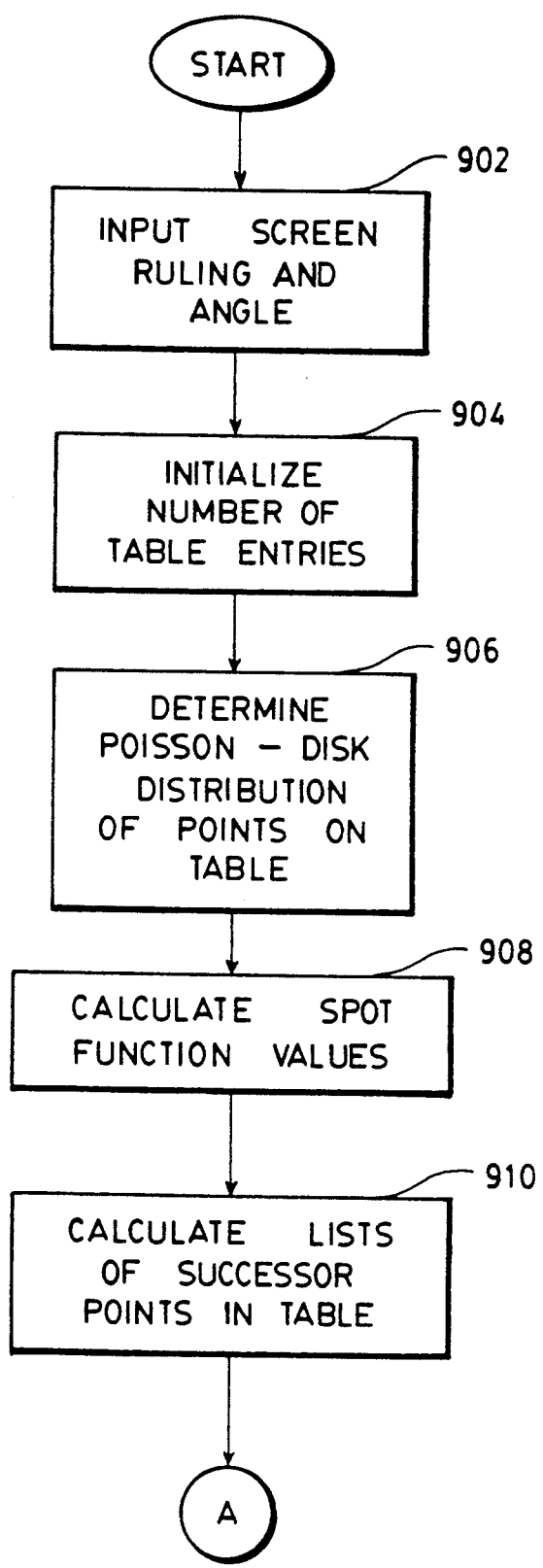
FIG. 9 is a program flow chart for initializing the screen pattern table in accordance with the present invention.

An initialization program flow chart for generating the stored rotated screen pattern table is shown in FIG. 9. First, the desired screen ruling and angle are input at step 902. Then, at step 904, the number of table entries is initialized. The actual Poisson-disk distribution of points in the table is generated at step 906. Alternatively, other random or pseudo-random or previously stored distribution of screen points may be used. After the table of UV points is generated, the spot function for each point is calculated at step 908, and the lists of successor points are stored in the table as indicated above.

Figure 10:
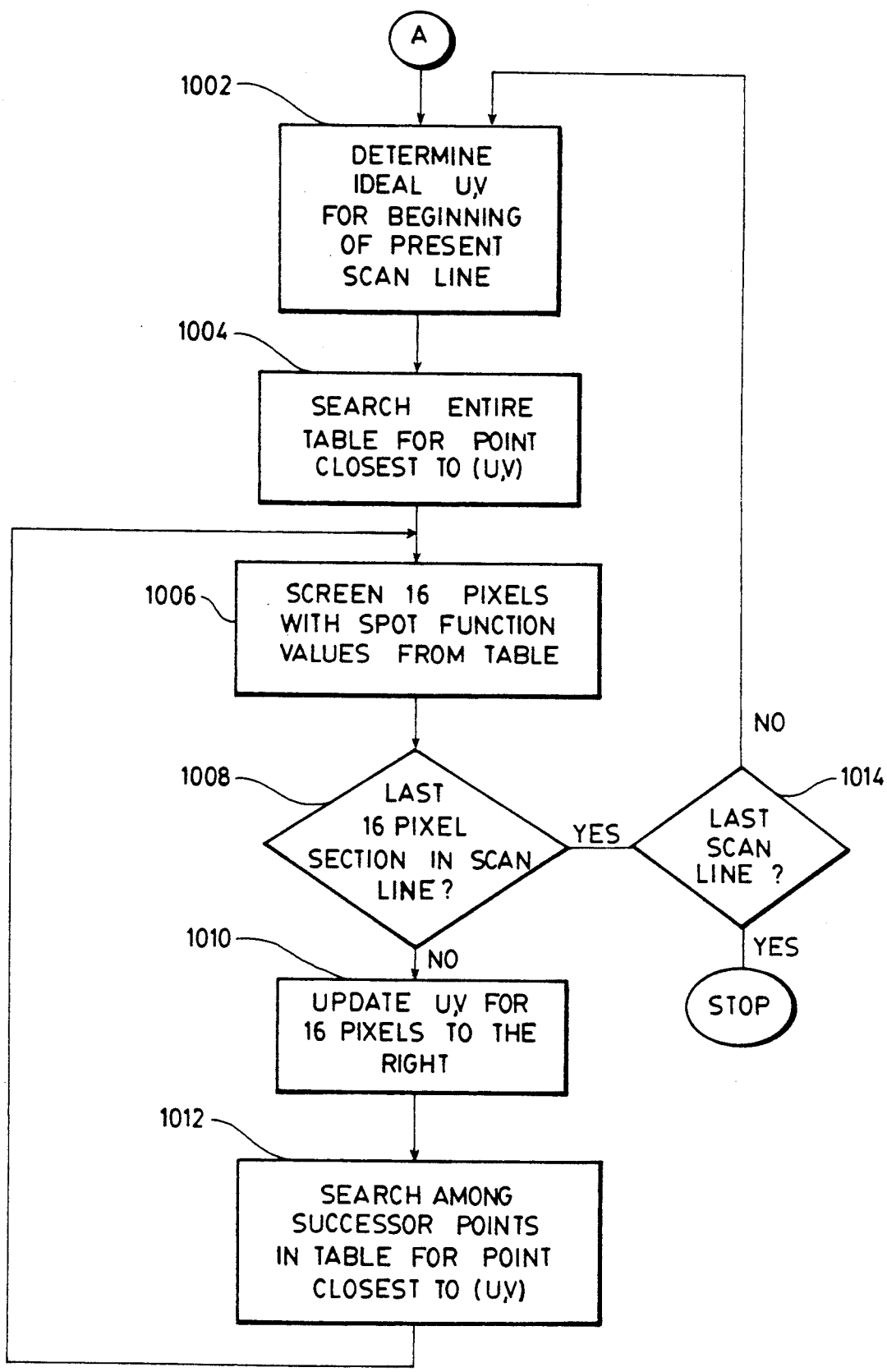
FIG. 10 is a program flow chart for generating a screen pattern in accordance with the present invention.

After initialization, the actual screening operation begins. FIG. 10 is flow chart for a programmed device, either a general purpose digital computer or a dedicated digital system, for screening an input image. First, the ideal UV coordinate for beginning the present scan line is determined at step 1002 and the entire table is searched for the closest point to said determined UV point at step 1004. At step 1006, 16 output pixels are screened using the 16 spot function values stored in the table entry. Then, the decision step 1008 determines whether the last 16 pixel section of the scan line is encountered. Screening continues at step 1010 by updating the UV position 16 pixels to the right in XY space, and then searching among the successor points in the table for the point with the minimum error function. In this case, error minimization is achieved by finding the closest actual stored screen point in XY space (which is equivalent to finding the closest point in UV space) to the ideal screen point at step 1012. The process repeats by looping back to step 1006 until the last 16 pixel section in the scan line is encountered at decision step 1008. Thereafter, the next scan line is processed by looping back to step 1002, until the last scan line is encountered at step 1014, and the program exits having screened the entire image.

What is claimed is:

1. In a method for generating a halftone screened image from an original image at a desired screen angle, said method including storing a screen pattern as an array of elements representing a desired spot function, transforming a point from said original image to an ideal screen point, selecting an actual screen point in said stored screen pattern array of elements to form a generated screen pattern, and screening said original image with said generated screen pattern to form said halftone screened image, the improvement comprising:

computing an error function based on the error between said ideal screen point and actual points in said stored screen pattern array, wherein said step of computing an error function comprises computing an error vector between an actual screen point and said ideal screen point; and selecting said actual screen point in said stored screen pattern which produces the least said computed error function.

2. A method for generating a halftone screened image from an original image at a desired screen angle, said method comprising:

storing a screen pattern as an array of elements representing a desired spot function;

transforming a point from said original image to an ideal computing an error function based on the error between said ideal screen point and actual points in said stored screen pattern array, wherein said step of computing an error function comprises computing an error vector between an actual screen point and said ideal screen point;

selecting an actual screen point in said stored screen pattern array of elements responsive to said transformed point, which produces the least said computed error function, to form a generated screen pattern; and screening said original image with said generated screen pattern to form said halftone screened image.

3. A method in accordance with claim 2, wherein said step of storing a screen pattern in an array of elements representing a desired spot function, further includes the step of storing a plurality of pointers associated with each said actual screen point and indicating a respective plurality of other actual screen points in said stored screen pattern array; and wherein said step of selecting an actual screen point in said stored screen pattern array of elements which results in the least said computed error function, comprises calculating a plurality of error functions corresponding to the error between each of said plurality of other actual screen points and said ideal screen point to form a respective plurality of error functions; and selecting one of said plurality of other screen points which corresponds to the minimum one of said plurality of calculated error functions.

4. A method in accordance with claim 2, further including:

storing a plurality of screen values for each actual screen point, said plurality of screen values representing successive points of an ideal angled screen pattern.

5. A method in accordance with claim 2, where said step of screening said original image with said generated screen pattern to form said halftone screened image comprises:

comparing said generated screen pattern with said original image; and generating a marking signal for a marking device based on said comparison between said generated screen pattern and said original image.

6. A method for generating a halftone screened image from an original image at a desired screen angle, said method comprising:

storing a screen pattern as an array of elements representing a desired spot function;

transforming a point from said original image to an ideal screen point;

computing an error function based on the error between said ideal screen point and actual points in said stored screen pattern array;

selecting an actual screen point in said stored screen pattern array of elements responsive to said transformed point, which produces the least said computed error function, to form a generated screen pattern; and screening said original image with said generated screen pattern to form said halftone screened image, wherein said step of computing an error function based on the error between said ideal screen point and actual points in said stored screen pattern array comprises calculating an error vector between said actual screen point and said ideal screen point.

7. A method in accordance with claim 6, wherein said step of calculating an error vector based on the error between said ideal screen point and said actual screen point comprises:

calculating an error vector in transformed UV space between said actual screen sample point and said ideal screen sample point.

8. A method in accordance with claim 6, wherein said error vector calculation is approximated as the sum of the absolute values of the orthogonal components of the displacement between said actual screen point and said ideal screen point.

9. In a method for generating a halftone screened image from an original image at a desired screen angle, said method including storing a screen pattern as an array of elements representing a desired spot function, transforming a point from said original image to an ideal screen point, selecting an actual screen point in said stored screen pattern array of elements to form a generated screen pattern, and screening said original image with said generated screen pattern to form said halftone screened image, the improvement comprising:

storing said screen pattern as a non-grid array of elements representing said desired spot function.

10. A method for generating a halftone screened image from an original image at a desired screen angle, said method comprising:

storing a screen pattern as a non-grid array of elements representing a desired spot function;

transforming a point from said original image to an ideal screen point;

selecting an actual screen point in said stored screen pattern array of elements responsive to said transformed point, to form a generated screen pattern; and screening said original image with said generated screen pattern to form said halftone screened image.

11. A method in accordance with claim 10, wherein said non-grid array is a random distribution of screen points.

12. A method in accordance with claim 10, wherein said non-grid array is a pseudo-random distribution of screen points.

13. A method in accordance with claim 10, wherein said non-grid array is a Poisson-disk distribution of screen points.

14. A method in accordance with claim 10, where said step of screening said original image with said generated screen pattern to form said halftone screened image comprises:

comparing said generated screen pattern with said original image; and generating a marking signal for a marking device based on said comparison between said generated screen pattern and said original image.

15. In a method for generating a halftone screened image from an original image at a desired screen angle, said method including storing a screen pattern as an array of elements representing a desired spot function, transforming a point from said original image to an ideal screen point, selecting an actual screen point in said stored screen pattern array of elements to form a generated screen pattern, and screening said original image with said generated screen pattern to form said halftone screened image, the improvement comprising:

storing said screen pattern as an non-grid array of elements representing said desired spot function;

computing an error function based on the error between said ideal screen point and actual points in said stored screen pattern array; and selecting said actual screen point in said stored screen pattern which produces the least said computed error function.

16. A method for generating a halftone screened image from an original image at a desired screen angle, said method comprising:

storing a screen pattern as a non-grid array of elements representing a desired spot function;

transforming a point from said original image to an ideal screen point;

computing an error function based on the error between said ideal screen point and actual points in said stored screen pattern array;

selecting an actual screen point in said stored screen pattern array of elements responsive to said transformed point, which produces the least said computed error function, to form a generated screen pattern; and screening said original image with said generated screen pattern to form said halftone screened image.

17. A method in accordance with claim 16, wherein said step of computing an error function based on the error between said ideal screen point and actual points in said stored screen pattern array comprises.

calculating an error vector between said actual screen point and said ideal screen point.

18. A method in accordance with claim 17, wherein said step of calculating an error vector based on the error between said ideal screen point and said actual screen point comprises:

calculating an error vector in transformed UV space between said actual screen sample point and said ideal screen sample point.

19. A method in accordance with claim 17, wherein said error vector calculation is approximated as the sum of the absolute values of the orthogonal components of the displacement between said actual screen point and said ideal screen point.

20. A method in accordance with claim 16, wherein said step of storing a screen pattern in an array of elements representing a desired spot function, further includes the step of storing a plurality of pointers associated with each said actual screen point and indicating a respective plurality of other actual screen points in said stored screen pattern array; and wherein said step of selecting an actual screen point in said stored screen pattern array of elements which results in the least said computed error function, comprises calculating a plurality of error functions corresponding to the error between each of said plurality of other actual screen points and said ideal screen point to form a respective plurality of error functions; and selecting one of said plurality of other actual screen points which corresponds to the minimum one of said plurality of calculated error functions.

21. A method in accordance with claim 16, further including:

storing a plurality of screen values for each actual screen point, said plurality of screen values representing successive points of an ideal angled screen pattern.

22. A method in accordance with claim 16, where said step of screening said original image with said generated screen pattern to form said halftone screened image comprises:

comparing said generated screen pattern with said original image; and generating a marking signal for a marking device based on said comparison between said generated screen pattern and said original image.

23. In an apparatus for generating a halftone screened image from an original image at a desired screen angle, said method including storing a screen pattern as an array of elements representing a desired spot function, transform a point from said original image to an ideal screen point, selecting an actual screen point in said stored screen pattern array of elements to form a generated screen pattern, and screening said original image with said generated screen pattern to form said halftone screened means for computing an error function based on the error between said ideal screen point and actual points in said stored screen pattern array, wherein said means for computing an error function comprises means for computing an error vector between an actual screen point and said ideal screen point; and means for selecting said actual screen point in said stored screen pattern which produces the least said computed error function.

24. An apparatus for generating a halftone screened image from an original image at a desired screen angle, said method comprising:

means for storing a screen pattern as an array of elements representing a desired spot function;

means for transforming a point from said original image to an ideal screen point;

means for computing an error function based on the error between said ideal screen point and actual points in said stored screen pattern array, wherein said means for computing an error function comprises means for computing an error vector between an actual screen point and said ideal screen point;

means for selecting an actual screen point in said stored screen pattern array of elements responsive to said transformed point, which produces the least said computed error function, to form a generated screen pattern; and means for screening said original image with said generated screen pattern to form said halftone screened image.

25. An apparatus in accordance with claim 24, wherein said means for storing a screen pattern in an array of elements representing a desired spot function, further includes the means for storing a plurality of pointers associated with each said actual screen point and indicating a respective plurality of other actual screen points in said stored screen pattern array; and wherein said means for selecting an actual screen point in said stored screen pattern array of elements which results in the least said computed error function, comprises calculating a plurality of error functions corresponding to the error between each of said plurality of other actual screen points and said ideal screen point to form a respective plurality of error functions; and means for selecting one of said plurality of other actual screen points which corresponds to the minimum one of said plurality of calculated error functions.

26. An apparatus in accordance with claim 24, further including:

means for storing a plurality of screen values for each actual screen point, said plurality of screen values representing successive points of an ideal angled screen pattern.

27. An apparatus in accordance with claim 24, where said means for screening said original image with said generated screen pattern to form said halftone screened image comprises:

means for comparing said generated screen pattern with said original image; and means for generating a marking signal for a marking device based on said comparison between said generated screen pattern and said original image.

28. An apparatus for generating a halftone screened image from an original image at a desired screen angle, said method comprising:

means for storing a screen pattern as an array of elements representing a desired spot function;

means for transforming a point from said original image to an ideal screen point;

means for computing an error function based on the error between said ideal screen point and actual points in said stored screen pattern array;

means for selecting an actual screen point in said stored screen pattern array of elements responsive to said transformed point, which produces the least said computed error function, to form a generated screen pattern; and means for screening said original image with said generated screen pattern to form said halftone screened image, wherein said means for computing an error function based on the error between said ideal screen point and actual points in said stored screen pattern array comprises means for calculating an error vector between said actual screen point and said ideal screen point.

29. An apparatus in accordance with claim 28, wherein said means for calculating an error vector based on the error between said ideal screen point and said actual screen point comprises:

means for calculating an error vector in transformed UV space between said actual screen sample point and said ideal screen sample point.

30. An apparatus in accordance with claim 28, wherein said error vector calculation is approximated as the sum of the absolute values of the orthogonal components of the displacement between said actual screen point and said ideal screen point.

31. In an apparatus for generating a halftone screened image from an original image at a desired screen angle, said method including storing a screen pattern as an array of elements representing a desired spot function, transforming a point from said original image to an ideal screen point, selecting an actual screen point in said stored screen pattern array of elements to form a generated screen pattern, and screening said original image with said generated screen pattern to form said halftone screened image, the improvement comprising:

means for storing said screen pattern as a non-grid array of elements representing said desired spot function.

32. An apparatus for generating a halftone screened image from an original image at a desired screen angle, said method comprising:

means for storing a screen pattern as a non-grid array of elements representing a desired spot function;

means for transforming a point from said original image to an ideal screen point;

means for selecting an actual screen point in said stored screen pattern array of elements responsive to said transformed point, to form a generated screen pattern; and means for screening said original image with said generated screen pattern to form said halftone screened image.

33. An apparatus in accordance with claim 32, wherein said non-grid array is a random distribution of screen points.

34. An apparatus in accordance with claim 32, wherein said non-grid array is a pseudo-random distribution of screen points.

35. An apparatus in accordance with claim 32, wherein said non-grid array is a Poisson-disk distribution of screen points.

36. An apparatus in accordance with claim 32, where said means for screening said original image with said generated screen pattern to form said halftone screened image comprises:

means for comparing said generated screen pattern with said original image; and means for generating a marking signal for a marking device based on said comparison between said generated screen pattern and said original image.

37. In an apparatus for generating a halftone screened image from an original image at a desired screen angle, said method including storing a screen pattern as an array of elements representing a desired spot function, transforming a point from said original image to an ideal screen point, selecting an actual screen point in said stored screen pattern array of elements to form a generated screen pattern, and screening said original image with said generated screen pattern to form said halftone screened image, the improvement comprising:

means for storing said screen pattern as an non-grid array of elements representing said desired spot function;

means for computing an error function based on the error between said ideal screen point and actual points in said stored screen pattern array; and means for selecting said actual screen point in said stored screen pattern which produces the least said computed error function.

38. An apparatus for generating a halftone screened image from an original image at a desired screen angle, said method comprising:

means for storing a screen pattern as a non-grid array of elements representing a desired spot function;

means for transforming a point from said original image to an ideal screen point;

means for computing an error function based on the error between said ideal screen point and actual points in said stored screen pattern array;

means for selecting an actual screen point in said stored screen pattern array of elements responsive to said transformed point, which produces the least said computed error function, to form a generated screen pattern; and means for screening said original image with said generated screen pattern to form said halftone screened image.

39. An apparatus in accordance with claim 38, wherein said means for computing an error function based on the error between said ideal screen point and actual points in said stored screen pattern array comprises:

means for calculating an error vector between said actual screen point and said ideal screen point.

40. An apparatus in accordance with claim 39, wherein said means for calculating an error vector based on the error between said ideal screen point and said actual screen point comprises:

means for calculating an error vector in transformed UV space between said actual screen sample point and said ideal screen sample point.

41. An apparatus in accordance with claim 39, wherein said error vector calculation is approximated as the sum of the absolute values of the orthogonal components of the displacement between said actual screen point and said ideal screen point.

42. An apparatus in accordance with claim 38, wherein said means for storing a screen pattern in an array of elements representing a desired spot function, further includes the means for storing a plurality of pointers associated with each said actual screen point and indicating a respective plurality of other actual screen points in said stored screen pattern array; and wherein said means for selecting an actual screen point in said stored screen pattern array of elements which results in the least said computed error function, comprises calculating a plurality of error functions corresponding to the error between each of said plurality of other actual screen points and said ideal screen point to form a respective plurality of error functions; and means for selecting one of said plurality of other actual screen points which corresponds to the minimum one of said plurality of calculated error functions.

43. An apparatus in accordance with claim 38, further including:

means for storing a plurality of screen values for each actual screen point, said plurality of screen values representing successive points of an ideal angled screen pattern.

44. An apparatus in accordance with claim 38, where said means for screening said original image with said generated screen pattern to form said halftone screened image comprises:

means for comparing said generated screen pattern with said original image; and means for generating a marking signal for a marking device based on said comparison between said generated screen pattern and said original image.

* * * * *